United States Patent [19]

Willett

[11] 4,408,441
[45] Oct. 11, 1983

[54] INTERCONNECTED, ADJUSTABLE HEIGHT TOPPER AND GATHERING ARM SYSTEM FOR SUGAR CANE HARVESTERS, ETC.

[75] Inventor: Harold A. Willett, Thibodaux, La.

[73] Assignee: Cameco Industries, Inc., Thibodaux, La.

[21] Appl. No.: 343,212

[22] Filed: Jan. 27, 1982

[51] Int. Cl.³ ............................................ A01D 45/10
[52] U.S. Cl. ............................................ 56/14.3; 56/59; 56/63
[58] Field of Search .................... 56/59, 14.3, 63, 503, 56/504, 121.46, 60, 56, 57, 58, 13.9, 14.5

[56] References Cited

U.S. PATENT DOCUMENTS

| | | | |
|---|---|---|---|
| 947,292 | 1/1910 | Bonham | 56/59 |
| 1,133,422 | 3/1915 | Barnett | 56/59 |
| 1,757,848 | 5/1930 | Stiles | 56/59 |
| 3,095,680 | 7/1963 | Thornton | 56/13.7 |
| 3,141,281 | 7/1964 | Gaunt et al. | 56/14.5 |
| 3,144,743 | 8/1964 | Gaunt et al. | 56/14.3 |
| 3,325,982 | 6/1967 | Fogels et al. | 56/14.3 |
| 3,673,774 | 7/1972 | Mizz | 56/14.3 |
| 3,772,864 | 11/1973 | Rodrigue | 56/503 |
| 3,791,114 | 2/1974 | Fowler | 56/59 |
| 3,925,199 | 12/1975 | Quick | 56/13.3 |

Primary Examiner—Paul J. Hirsch
Attorney, Agent, or Firm—C. Emmett Pugh

[57] ABSTRACT

A sugar cane harvester having at its front end a topper section for cutting off the tops of the cane stalks and upper and lower sets of cane gathering arms which gather up the cane and bring it into the harvester for harvesting at its base and topping at its top. The topper section is carried on a vertically moveable base riding on vertical tracks for varying the height of the topping cuts, to which base is also pivotally connected the harvester ends of the upper set of cane gathering arms, thus interconnecting the topper cutter entry or harvester ends of the upper arms and the topper section for combined movement together. Variable length, telescoping bracing arms are pivotally connected between the left, upper and lower arms and the right, upper and lower arms, respectively, to provide stabilizing bracing to the upper sets of arms when they are vertically varied with the topper section. The vertical movement of the topper section maintains the optimum cutting angle despite the adjustability of the cutting height and the combined movement of the upper cane gathering arms.

6 Claims, 4 Drawing Figures

INTERCONNECTED, ADJUSTABLE HEIGHT TOPPER AND GATHERING ARM SYSTEM FOR SUGAR CANE HARVESTERS, ETC.

BACKGROUND OF INVENTION

1. Field of Invention

The present invention relates to harvesters for sugar cane and the like, which at the harvester's front, entry end includes a cane topper for cutting off the tops of the cane stalks and cane gathering arms for gathering in the cane stalks for harvesting and topping and further handling. More particularly, the present invention is directed to an interconnected, adjustable height topper and gathering arm system for such harvesters.

2. Prior Art

A typical sugar cane harvester in use today will usually include a wheel-mounted, power-driven main frame; left and right, row straddling sets of crop lifter and gathering arms extending forwardly and downwardly from both sides of the front of the main frame and adapted (as the harvester is advanced) to pass to either side of a row of cane to be harvested to pick up and gather in the cane; a topping cutter mounted at a high level on the main frame and adapted (as the harvester advances) to sever the tops of the cane; and base cutter means on the frame to cut the cane stalks off at or near the ground level; as well as other equipment not particular pertinent to the present invention.

A list of exemplary prior art patents illustrating cane harvesters having both topper sections and cane gathering arm sections are listed below:

| Patentee(s) | Pat. No. | Issue Date |
| --- | --- | --- |
| I. H. Athey | 1,741,602 | Dec. 31, 1929 |
| S. A. Thornton | 3,095,680 | July 2, 1963 |
| J. K. Gaunt et al | 3,141,281 | July 21, 1964 |
| J. K. Gaunt et al | 3,144,743 | Aug. 18, 1964 |
| M. W. Fogels et al | 3,325,982 | June 20, 1967 |
| J. K. Gaunt et al | 3,434,271 | Mar. 25, 1969 |
| J. M. Mizzi | 3,673,774 | July 4, 1972 |
| D. J. Quick | 3,925,199 | Dec. 9, 1975 |

In the prior art, the cane toppers were either not connected to the gathering chain arms, with only the cane toppers being adjustable in height and the arms fixed, or the two separately adjustable; or, when interconnected, the topper blade angle varied with changes in height (from for example an optimum angle to a non-optimum angle). In the first instance, this resulted in greater mechanical complexity or a sacrifice in arm adjustability, or, in the latter instance, in unsatisfactory cane topping as the blade angle was varied to a non-optimum angle during height adjustment due to varying cane conditions during harvesting.

The present invention overcomes all these prior art deficiencies in a relatively simple, straight-forward, and reliable manner, producing a cane harvester with great flexibility to meet varying cane height conditions, with no loss in the quality of the topper cut.

3. General Discussion of Invention

The present invention mechanically joins the cane topper section and the upper cane gathering arm assemblies together for common movement on a vertically traveling base moving on vertical tracks. In the preferred embodiment, a variable length, pivoting, bracing arm support is included between the upper and lower, cane gathering arm assemblies to provide support to the upper cane gathering arms as they are moved up and down with the topper section. The topper cutter is maintained at its set, optimum cutting angle as its vertical height is varied.

In the present invention, the topper cutting angle is thus maintained at a constant optimum cutting angle as the topper and the attached, upper gathering arms are raised or lowered, in contrast to the prior art systems which had varied cutting angles, usually not optimum, as their connected topper and gathering arm assemblies were raised and lowered.

In the present invention, the operator controlled, continuously variable height, gathering arm and topper assembly provides the capability to gather, align, lift, and raise the cane, especially "down cane," to the proper height and position for topping at the optimum height and cutting angle, as field and cane conditions during harvesting. In contrast, prior art systems either had an adjustable topper and non-adjustable gathering arms, or had adjustable height, combined topper and gathering arm assemblies that would not maintain the optimum topper cutting angle as the topper/gathering arms are were raised and lowered.

BRIEF DESCRIPTION OF DRAWINGS

Other objects and advantages of the present invention and a fuller understanding thereof may be had by referring to the following detailed description and claims taken together with the accompanying drawings, briefly described below, in which like parts are given like reference numerals and wherein:

DETAILED DESCRIPTION OF THE PREFERRED EMBODIMENT

Figure 1:
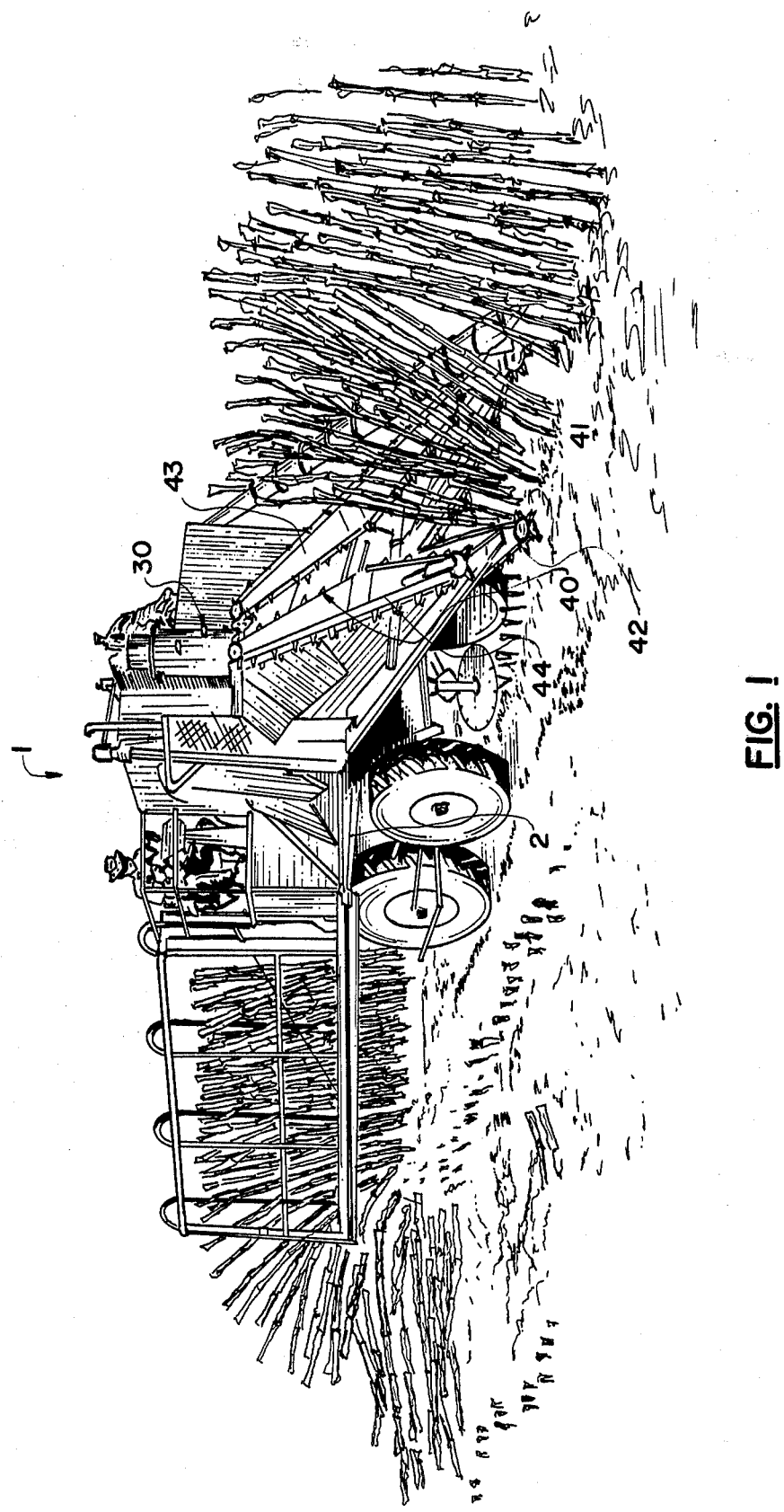
FIG. 1 is a front, perspective view of the preferred embodiment of the sugar cane harvester of the present invention, shown harvesting cane.
Figure 2:
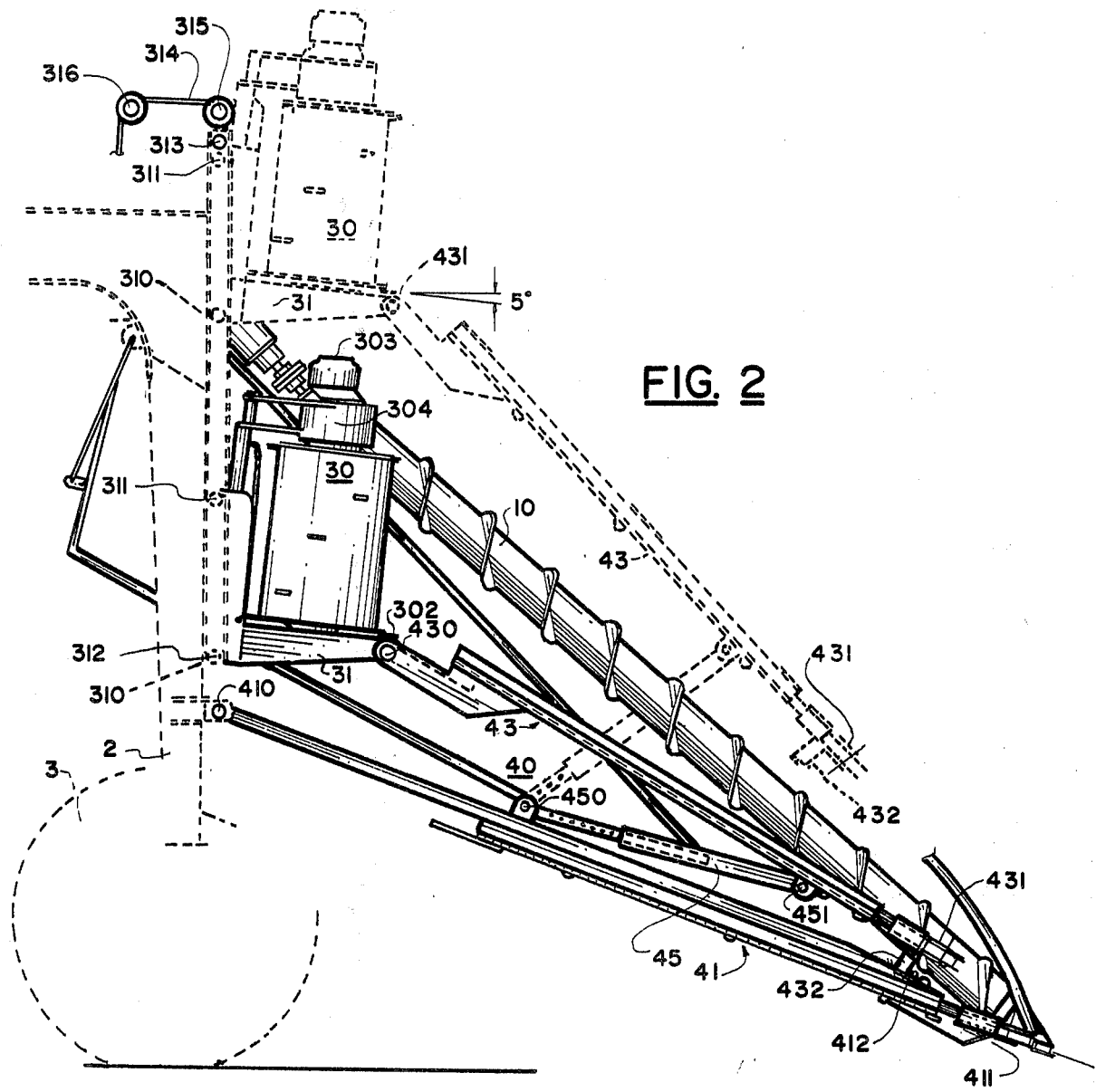
FIG. 2 is a side, elevated, partial view of the front end of the sugar cane harvester of FIG. 1 showing the preferred embodiment of the invention with the topper section and the connected upper cane gathering arms in a first, lowermost position, and, in phantom line, in a second, highermost position, with the near right hand set of cane gathering arms removed to show the inner structure of the system.
Figure 3:
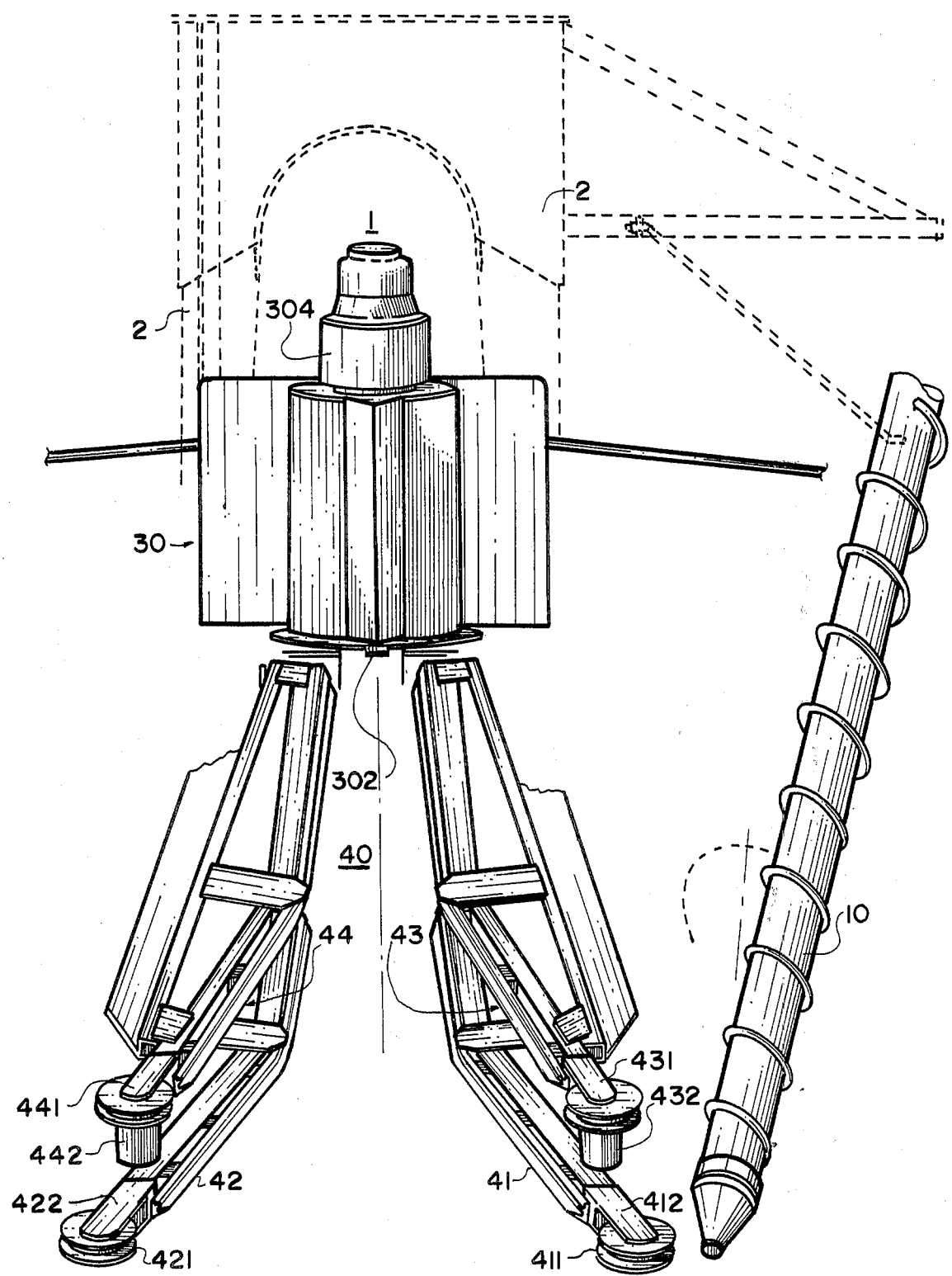
FIG. 3 is a front elevation of the embodiment of FIG. 2 but with the upper cane gathering arms partially raised and with both the left and the right hand sets of arms illustrated and with the cane raising screw shown.
Figure 4:
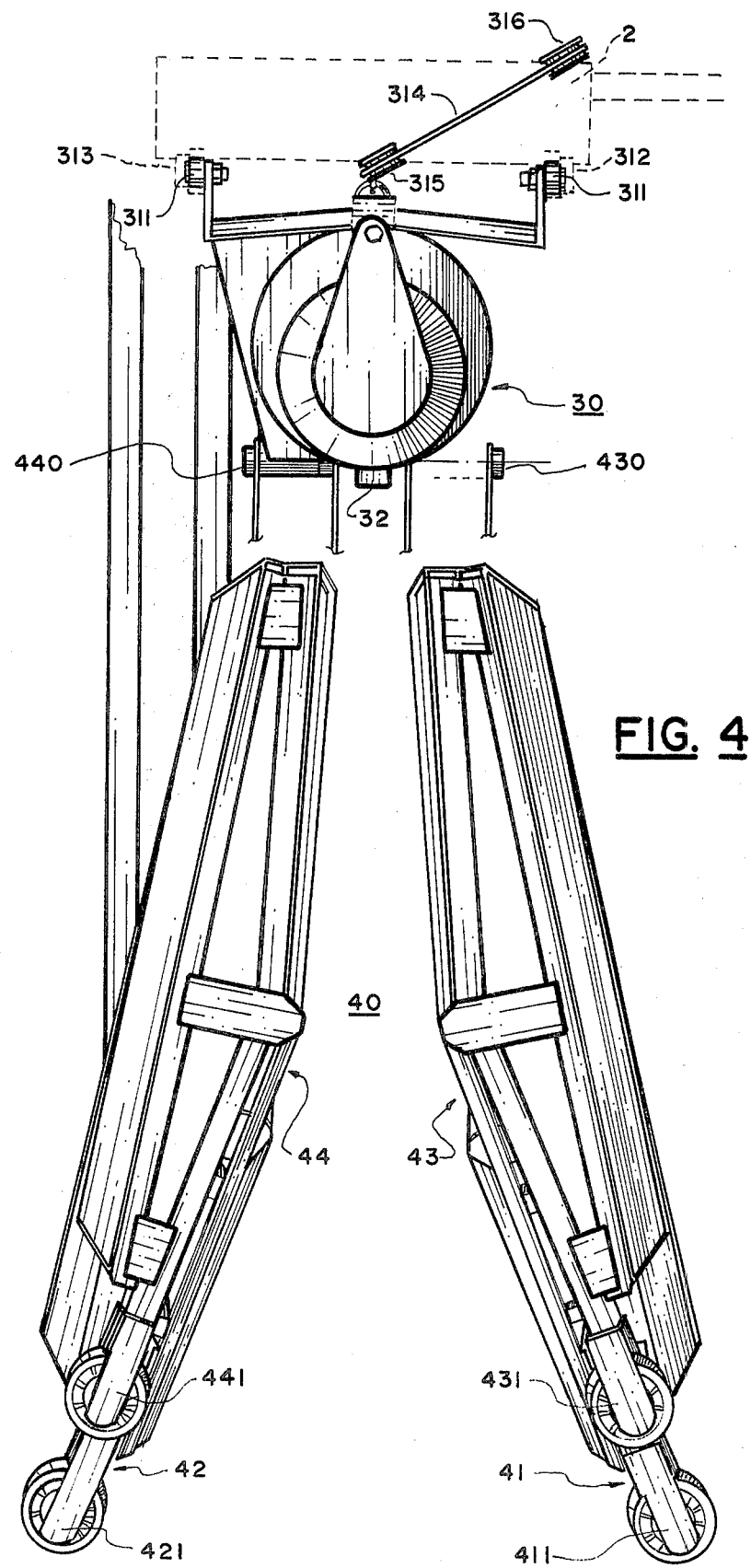
FIG. 4 is a plan view of the embodiment of FIG. 2 with both sets of cane gathering arms illustrated (as in FIG. 2), but with the cane raising screw removed for simplicity purposes.

As can be seen in FIGS. 1–4, at the front end of the cane harvester 1 (illustrated only in phantom lined generality), there is included in the preferred embodiment of the present invention a cane topping section 30 and a cane gathering arm section 40 both carried by the main frame 2 of the harvester 1. It is noted that the harvester 1 illustrated is used to harvest individual rows of cane. However, by adding a further like cane gathering section 40 side-by-side to the one illustrated, the harvester would then be capable of simultaneously harvesting two, parallel rows to cane. etc. For a further understanding of the double-row harvester, reference is had to the assignee's companion patent application entitled "Cane Topping Saw With Chopping Blades" being filed concurrently herewith, the full disclosure of which is incorporated herein by reference.

The cane gathering arm section 40 includes a lower set of opposed, left-and-right cane gathering arms 41, 42, and an upper set of opposed, left-and-right cane gathering arms 43, 44, which all extend out and downwardly in front of the harvester 1. As will be understood more fully from the detailed, structural description below, the upper set of arms 43, 44 is vertically moveable for varying heights of cane, while the lower set 41, 42 is generally fixed with respect to the main harvester frame 2.

The lower set 41, 42 is supported at their harvester end on the main frame 2 of the harvester 1 by means of pivot joints 410, 420, which are at a fixed vertical height with respect to the main frame 2. The upper set 43, 44 is supported at their harvester end by means of pivot joints 430, 440 to a vertically moveable base 31.

The upper set of arms 43, 44 are also generally free to move vertically and longitudinally with respect to the lower set 41, 42 at their cane entry ends 411, 421 and 431, 441, respectively (compare phantom-lined and solid-lined illustrations of elements 431 in FIG. 1). The upper set 43, 44 of arms includes rest support legs 432, 442, respectively, which contact and rest on (note FIG. 1) the upper surfaces 412, 422 of the lower set 41, 42 of arms, when the arms 43, 44 are in their lowermost positions.

Variable length, telescoping bracing arms 45, 46 are provided between the left, lower and upper arms 41, 43 and between the right, lower and upper arms 42, 44, respectively, to give stabilizing support to the cane entry ends 431, 441 of the upwardly moveable arms 43, 44. As seen in FIG. 1, the telescoping bracing arm 45 is connected between cane gathering arms 41, 43 by pivot joints 450, 451, and like connections are provided for the telescoping bracing arm 46.

Also mounted on the vertically moveable base 31 is the topper cutter section 30, which includes peripherally spaced cutter blades 302 which rotate about a vertical axis 303. The rotating blades 302 top off the tops of the cane as the cane is gathered by the arm section 40 and their tops brought up to the rotating cutter blades 302 by the upper, cane gathering arms 43, 44. The upper arms 43, 44 have their cane exit, harvester ends located in juxtaposition to the topper section 30 and lead the cane right into the cutter blades 302. A motor drive 304 is located at the top of the topper section 30 to drive the cutter blades 302. For further information on the topper section 30, reference is had to the concurrently filed patent application referred to above.

The traveling base 31 is carried by lower and upper rollers 310, 311, which travel in vertically disposed, channel tracks 312, 313 fixed to the main frame 2. Lower and upper stops 314, 315 are included at the ends of the channel tracks 312, 313 to keep the vertical movement of the base 31 within the desired limits. To vertically vary the base 31 with respect to the main frame 2, a cable 314 extends from the base 31 up and over the sheaves 315, 316 to for example a hydraulic cylinder or winch or other means located on the harvester 1 for pulling in and letting out the cable 314 under the control of the harvester operator.

In operation, as the harvester 1 is driven along a row of sugar cane, the cane gathering arm section 40, which straddles the row, causes the cane to be initially raised (if down) by means of one or two rotating, row dividing, archimedes screws 10 or row dividing chains, and then gathered up and in by means of the lower, opposed cane gathering arms 41, 42 and then the upper, opposed cane gathering arms 43, 44. (For simplicity purposes, the standard, endless gathering chains and lugs which run around the arms 41-44 are not illustrated.) The arms 41-44 gather in the cane and position the stalks vertically and bring them to the topper 30 for cutting of their tops by the rotating blades 302 and to the main harvester cutter (not illustrated) for cutting the cane stalks at their base.

As cane conditions vary, the cutting height of the cutter section 30 can be varied as desired by vertically moving the base 31, which also moves the interconnected, upper set of arms 43, 44. As the base 31 moves up, for example, from the lowermost position shown in solid lines in FIG. 1 up to its uppermost position shown in phantom line in FIG. 1, the topper 30 and harvester end of the upper arms 43, 44 likewise move an equal vertical distance. During this vertical, height adjusting movement, the angle of cutter blades 302 is kept constant at its optimum setting, for example at five degrees down from the horizontal. The front, cane entry ends 431, 441 of the arms are allowed to move up and back and still retain support bracing through the variable length, telescoping bracing arms 45, 46, which shorten as the topping height is increased. This pivoting interconnection between the lower and upper sets of arms 41-44 also maintains the downwardly directed orientation of the upper set of arms 43, 44, enhancing its gathering function of the cane stalks and their delivery to the topper section 30.

The present invention thus achieves height adjustability or variability of the topper section 30 and the connected, upper, cane gathering arms 43, 44, while maintaining the topping blades at their optimum cutting angle.

After the cane stalks are harvested and topped, they are usually conveyed on further into the harvester 1 for stacking, or for in other forms of harvesters, for further processing, such as for example cleaning and billeting of the harvested cane stalks.

The foregoing described and illustrated embodiment of the present invention is of course only exemplary, and the structural details and specific mechanical features are subject to great variation and change within the scope of the present invention.

Because many varying and different embodiments may be made within the scope of the inventive concept herein taught, and because many modifications may be made in the embodiment herein detailed in accordance with the descriptive requirements of the law, it is to be understood that the details herein are to be interpreted as illustrative and not in a limiting sense.

What is claimed is:

1. A cane harvester, having a topper section and cane gathering arms at its front end, comprising
 a main frame;
 topper section means having a rotatable cutter for cutting the tops of the cane;
 a set of vertical tracks fixedly mounted on said frame;
 a vertically moveable base carrying said topper section means mounted on said vertical tracks for vertical movement up and down said tracks, varying the cutter height of said topper section means; and
 topper cane gathering arm means extending out and down from the front of said main frame for gathering up the cane being harvested and bringing it to said topper section for topping, the harvester end of said cane gathering arm means being pivotally connected to said base and topper section means for combined vertical movement with said base and topper section means, said topper section means and said cane gathering arm means being vertically moveable together for height adjustment of said topper section without significantly varying the angle of cut of said rotatable cutter.

2. The cane harvester of claim 1, wherein there is further included lower cane gathering arms means connected to and extending out from the front of said main frame below said topper cane gathering arm means for gathering in the cane being harvested and bringing it into the harvester; and variable length, bracing means pivotally connected to and between said topper arm means and said lower arm means for bracing and stabilizing said topper arm means as it is raised and lowered with said topper section means.

3. The cane harvester of claim 2, wherein said lower arm means is pivotally connected to said main frame.

4. The cane harvester of claim 1, wherein said cutter rotates about a substantially vertically axis.

5. The cane harvester of claim 4, wherein said base has upper and lower sets of laterally spaced rollers riding in said tracks, said tracks forming confining channels for said rollers during vertical movement of said base.

6. The cane harvester of claim 5, wherein said confining channels have upper and lower stops at their upper and lower ends limiting the amount of vertical travel of said base.

* * * * *